US012223300B2

(12) United States Patent
Yang et al.

(10) Patent No.: US 12,223,300 B2
(45) Date of Patent: Feb. 11, 2025

(54) DEEP LEARNING MODEL INFERENCE FOR DYNAMIC INPUT SHAPES

(71) Applicant: MEDIATEK INC., Hsinchu (TW)

(72) Inventors: Meng-Hsuan Yang, Hsinchu (TW);
Po-hua Huang, Hsinchu (TW);
Hsing-Chang Chou, Hsinchu (TW);
Ting Chen Tsan, Hsinchu (TW);
Yu-Lung Lu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 144 days.

(21) Appl. No.: 18/309,341

(22) Filed: Apr. 28, 2023

(65) Prior Publication Data
US 2024/0361999 A1 Oct. 31, 2024

(51) Int. Cl.
*G06F 8/41* (2018.01)
*G06N 3/10* (2006.01)
(52) U.S. Cl.
CPC .............. *G06F 8/443* (2013.01); *G06N 3/10* (2013.01)
(58) Field of Classification Search
CPC .................................. G06F 8/443; G06N 3/10
See application file for complete search history.

(56) References Cited

U.S. PATENT DOCUMENTS

| | | | | |
|---|---|---|---|---|
| 10,360,467 B2 * | 7/2019 | Yoo | ............................ | G06T 5/70 |
| 11,106,434 B1 * | 8/2021 | Liu | ............................ | G06F 8/71 |
| 11,494,608 B2 * | 11/2022 | Fais | ............................ | G06F 8/41 |
| 11,676,366 B1 * | 6/2023 | Cooke | ............................ | G06V 10/60 |
| | | | | 382/154 |
| 11,830,167 B2 * | 11/2023 | Gou | ............................ | G06V 10/758 |
| 11,850,113 B2 * | 12/2023 | Katzman | ............................ | G06F 18/2413 |
| 12,051,206 B2 * | 7/2024 | Chen | ............................ | G06T 5/50 |
| 2017/0316287 A1 | 11/2017 | Mu | | |
| 2020/0242154 A1 * | 7/2020 | Haneda | ............................ | G06F 16/535 |
| 2022/0101578 A1 * | 3/2022 | Bedi | ............................ | G06T 11/00 |

(Continued)

FOREIGN PATENT DOCUMENTS

| | | |
|---|---|---|
| CN | 102045096 A | 5/2011 |
| TW | 201713064 A | 4/2017 |

OTHER PUBLICATIONS

Lianmin Zheng et al., "Ansor: Generating High-Performance Tensor Programs for Deep Learning", ARXIV:2006.06762v4, Nov. 4, 2020, XP081807041, pp. 1-19. ,Nov. 4, 2020.

(Continued)

*Primary Examiner* — Douglas M Slachta
(74) *Attorney, Agent, or Firm* — Winston Hsu

(57) ABSTRACT

A method of compiling a deep learning model includes reading metadata from a compiled result, the metadata indicating a structure of the deep learning model corresponding to a low-level IR, receiving shape information of an input tensor of the deep learning model, determining a shape of an output tensor of a first computation operation of the computation operations based on the shape information of the input tensor of the deep learning model and the structure of the deep learning model, tiling the output tensor of the first computation operation into one or more tiles according to the shape of the output tensor of the first computation operation and hardware limitations of a processor executing the deep learning model, and patching one or more copies of a templated hardware command into executable hardware commands.

20 Claims, 7 Drawing Sheets

(56) References Cited

U.S. PATENT DOCUMENTS

| | | | |
|---|---|---|---|
| 2022/0122431 A1* | 4/2022 | Barton | G06T 7/80 |
| 2022/0309316 A1 | 9/2022 | Nama | |
| 2022/0351366 A1* | 11/2022 | Sharma | G06V 20/698 |
| 2023/0004365 A1 | 1/2023 | Hanebutte | |
| 2023/0297643 A1* | 9/2023 | Shivam | G06F 17/16 |
| | | | 708/503 |
| 2023/0315410 A1* | 10/2023 | Yang | G06F 8/443 |
| | | | 717/151 |

OTHER PUBLICATIONS

Haichen Shen, et al., NIMBLE: Efficiently Compiling Dynamic Neural Networks for Model Inference, Proceedings of the 4th MLSys Con San Jose, CA, USA, 2021. Copyright 2021 by the author(s), 15 pgs.

Kai Zhu, et al., DISC: A Dynamic Shape Compiler for Machine Learning Workloads, arXiv:2013.05288v2 [cs.DC] Nov. 23, 2021, 7 pgs.

* cited by examiner

DEEP LEARNING MODEL INFERENCE FOR DYNAMIC INPUT SHAPES

TECHNICAL FIELD

The present disclosure relates to deep learning model compilation technologies.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

When dealing with dynamic shape load in deep learning compilation, a common challenge is the dynamic shape problem. For example, state-of-the-art compilers can minimize off-chip memory access by fusing memory-intensive operations. Fusion kernels with identical fusion patterns and tensor shapes can share binary code, but those with different tensor shapes require recompilation. When the number of shapes is substantial, the compilation overhead, as well as memory usage, can become overwhelming, making static shape compilation impractical.

SUMMARY

Aspects of the disclosure provide a method of compiling a deep learning model. The method can include reading metadata from a compiled result, the metadata being extracted from a low-level intermediate representation (IR) generated from a deep learning compilation process for compiling the deep learning model, the metadata indicating a structure of the deep learning model corresponding to the low-level IR, the structure including computation operations and connections connecting the computation operations; receiving shape information of an input tensor of the deep learning model; determining a shape of an output tensor of a first computation operation of the computation operations based on the shape information of the input tensor of the deep learning model and the structure of the deep learning model; tiling the output tensor of the first computation operation into one or more tiles according to the shape of the output tensor of the first computation operation and hardware limitations of a processor executing the deep learning model; and patching one or more copies of a templated hardware command into executable hardware commands, the one or more copies of the templated hardware command corresponding to the one or more tiles, respectively, the templated hardware command being part of the metadata and corresponding to the first computation operation.

In an example, the compiled result includes the metadata and model parameters of the deep learning model. In an example, the method further includes executing the executable hardware commands on the processor to process a first sequence of pictures in a video, the first sequence of pictures having a first picture size corresponding to the shape information of the input tensor; in response to detecting a second sequence of pictures having a second picture size in the video different from the first picture size to be processed using the deep learning model, performing the steps of determining the shape of the output tensor of the first computation operation of the computation, determining how to tile the output tensor of the first computation operation, and patching the one or more copies of the templated hardware command to generate new executable hardware commands, with the second picture size used as the shape information of the input tensor; and executing the new executable hardware commands to process the second sequence of pictures in the video.

In an example, the patching the one or more copies of the templated hardware command into the executable hardware commands includes modifying a field of the respective copy of the templated hardware command, the field including one of a memory address corresponding to hardware commands of the first computation operation, a memory offset corresponding to the respective copy of templated hardware command, and a register value for filling a register of the processor.

In an example, the method can further include receiving the deep learning model that is a dynamic shape model; converting the dynamic shape model into a static shape model; optimizing the static shape model to generate a low-level intermediate representation (IR) that is a hardware-optimized IP targeting the processor; extracting the metadata from the low-level IR; and storing the metadata and model parameters of the deep learning model as the compiled result.

In an example, the optimizing the static shape model to generate the low-level IR includes tiling an output tensor of the first computation operation based on the hardware limitations of the processor executing the deep learning model; and generating the templated hardware command corresponding to each tile resulting from the tiling. In an example, the method can further include transmitting the compiled result including the metadata and model parameters of the deep learning model to a mobile device containing the processor.

Aspects of the disclosure provide an apparatus of learning model compilation. The apparatus can include circuitry configured to read metadata from a compiled result, the metadata being extracted from a low-level IR generated from a deep learning compilation process for compiling the deep learning model, the metadata indicating a structure of the deep learning model corresponding to the low-level IR, the structure including computation operations and connections connecting the computation operations; receive shape information of an input tensor of the deep learning model; determine a shape of an output tensor of a first computation operation of the computation operations based on the shape information of the input tensor of the deep learning model and the structure of the deep learning model; tile the output tensor of the first computation operation into one or more tiles according to the shape of the output tensor of the first computation operation and hardware limitations of a processor executing the deep learning model; and patch one or more copies of a templated hardware command into executable hardware commands, the one or more copies of the templated hardware command corresponding to the one or more tiles, respectively, the templated hardware command being part of the metadata and corresponding to the first computation operation.

Aspects of the disclosure further provide a non-transitory computer-readable medium storing instructions that, when executed by a processing circuitry, cause the processing circuitry to perform the method of compiling a deep learning model.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
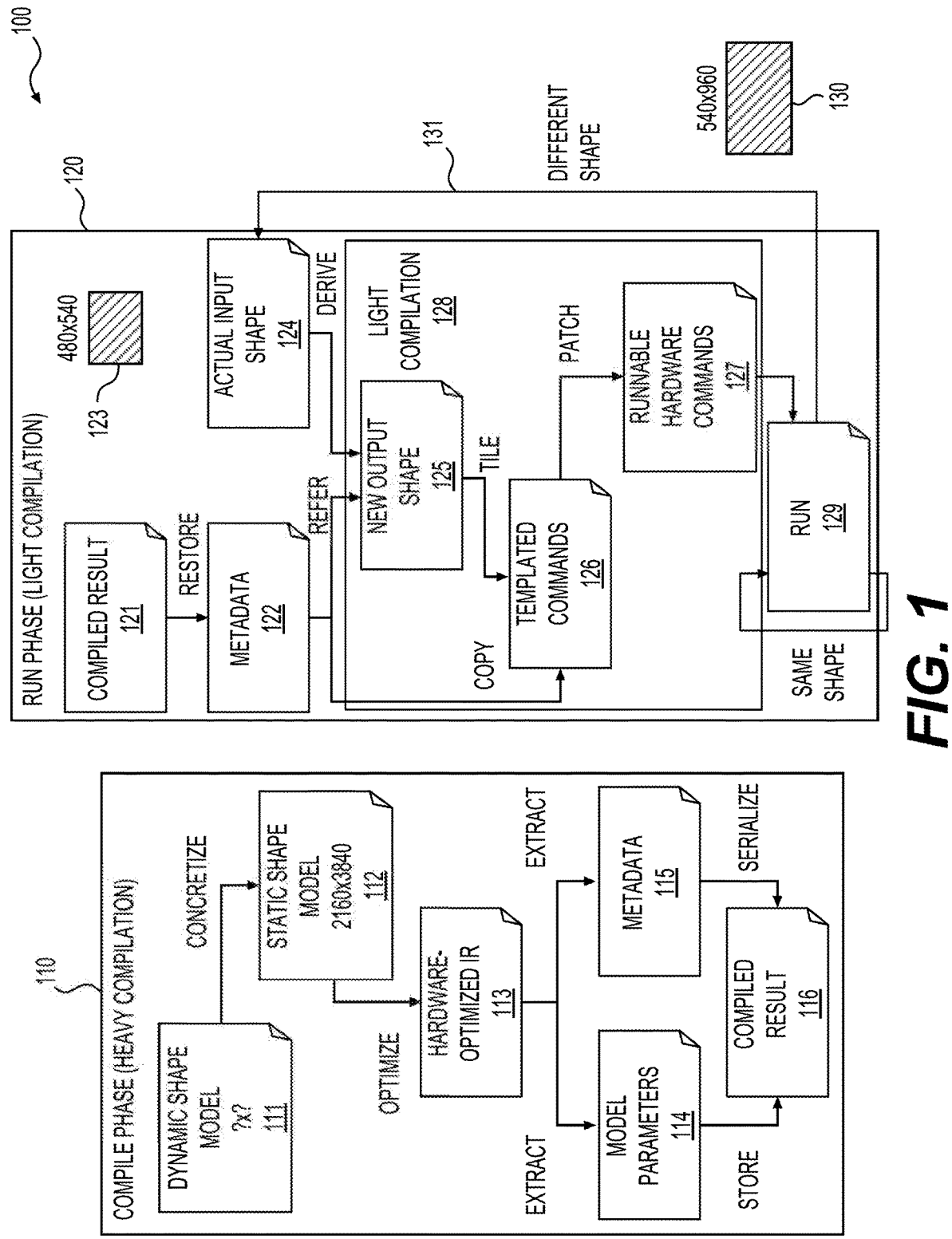
FIG. 1 shows a deep learning model inference process 100 according to embodiments of the disclosure.

Deep learning is a powerful tool in today's applications. Deep learning can achieve tasks that were previously impossible in applications such as computer vision and speech recognition. For example, watching videos is a very common use case in mobile phone usage. In order to enhance the video viewing experience, deep learning algorithms such as video super resolution and video motion estimate and motion compensation have been proposed to improve the viewing quality. When using deep learning algorithms, one type of video resolution often requires a corresponding deep learning model. However, in actual video playback scenarios, the sources of videos vary. The video resolution size is often not fixed. Therefore, multiple compiled results for all possible video resolutions need to be provided in order to use deep learning algorithms on different videos. Also, multiple copies of compiled deep learning models occupy a lot of storage space. Thus, this approach is impractical.

The above problem is called a dynamic shape problem where input tensor shapes vary during deep learning inference. The present disclosure provides a compilation mechanism to solve the problem. The compilation mechanism can be employed to process an originally fixed or dynamic deep learning model and enable it to handle different video resolutions in real time. Thereby, one deep learning model can be applied to multiple input video resolutions. Storage space can also be saved.

There can be two types of solutions for handling dynamic shape load in the related art. One current solution is to enumerate all possible video resolutions and generate a corresponding deep learning model for each possible resolution input. However, this approach is impractical because it is impossible to enumerate all resolution combinations and would require a large amount of storage space. Another solution is to recompile the deep learning model with a specific input shape before each execution to adapt to the input video resolution. However, this approach can cause significant delays, which is unfeasible for real-time applications where speed is critical. Both current solutions have limitations and are not ideal for efficient and real-time video processing. Therefore, there is a need for a more efficient and practical solution that can handle different input video resolutions in real time without incurring significant delays or storage space requirements.

A compilation process employing the compilation mechanism disclosed herein can be performed as follows. First, dynamic input shape features can be added to an original deep learning model. The original deep learning model can thus be changed from a fixed or static model to an undefined-size or dynamic model accepting an undefined input size or shape. Then, during the compilation, the undefined (unknown) size or shape of the undefined-size model is updated by the shape inference with the user-defined input size or shape. This fixed model is optimized through multiple stages. After the model is optimized for targeting hardware at the last stage, the parameters (including weights and constants) of the deep learning model are stored in the compiled file. Additionally, a small amount of core metadata is recorded and saved in the compiled file. The metadata can be used to obtain the actual output size during runtime based on an actual input size.

During runtime, the core metadata is retrieved from the compiled file to perform a lightweight compilation. Once the actual input resolution (input shape) is determined, the output size can be derived based on the input resolution using the model's core metadata. The output result is then divided into smaller tiles (during a tiling operation) based on hardware limitations. Machine code (machine command) corresponding to each tile is generated and combined and later executed on the hardware. In this way, various input shapes can be handled in real time.

The compilation technologies disclosed herein have several advantages. For example, only one deep learning model is needed to execute multiple possible resolutions (or input shapes). Only one compiled result is required, saving storage space. During runtime, only a quick lightweight compilation is needed using core metadata, which reduces delay and allows for real-time applications.

FIG. 1 shows a deep learning model inference process 100 according to embodiments of the disclosure. During the inference process 100, one single deep learning model is used to process video sequences with various resolutions in real time. The inference process 100 can include two phases: a compile phase 110 and a run phase 120. During the compile phase 110, a first compiler, referred to as a heavy compiler, can be employed to perform a slow heavy compilation. For example, the compile phase 110 may last several to dozens of seconds. During the run phase 120, a second compiler, referred to as a light compiler, can be employed to perform a quick light compilation 128 for a specific input size of a picture sequence. The light compilation 128 may last several milliseconds. The light compilation 128 can be configured only to repeat when an input video changes its picture resolution.

As shown, at the beginning of the compile phase 110, a dynamic shape model 111 can be received at the heavy compiler. In some examples, the dynamic shape model 111 can be described using a format corresponding to a deep learning framework, such as PyTorch, TensorFlow, and the like. The dynamic shape model 111 can have parameters specifying an input tensor shape with unknown (or undecided) tensor dimension values. For example, the dynamic shape model 111 can be trained for video processing, such as super resolution or video motion estimate and motion compensation. The input picture size of a picture sequence can be represented as [?×?]. By interpreting the unknown dimension values, the heavy compiler can identify the dynamic shape model 111 as a dynamic shape model. Accordingly, it can be determined that the two-phase inference process is to be performed for the dynamic shape model 111.

In the next step, the dynamic shape model 111 can be concretized into a static shape model 112. For example, the unknown tensor dimension values of the input tensor shape can be replaced with concrete values. For example, the input picture size [?×?] can be changed to fixed values (default values) of [2160×3840] (pixels). Thereafter, a static-shape oriented compilation process can be carried out to compile the static shape model 112 to generate a hardware-optimized intermediate representation (IR) 113 (or referred to as a low-level IR 113) for targeting hardware. The targeting hardware can be a central processing unit (CPU), a graphic processing unit (GPU), a field programming gate array (FPGA), an application-specific integrated circuit (ASIC), and the like.

During the static-shape oriented compilation process, the static shape model 112 can be transformed through a sequence of IRs. For example, the IRs can include high-level IRs employed in a front-end phase and low-level IRs employed in a back-end phase. In the transformation between neighboring IRs, various deep learning optimization techniques can be employed to optimize the deep learning model. For example, node-level, block-level, and data-flow level optimizations can be performed based on graph IRs in the front-end phase. Hardware intrinsic mapping, memory application and fetching, memory latency hiding, loop oriented optimization, parallelization, and the like, can be performed based on low-level IRs in the back-end phase.

In some examples, input or output tensor tiling techniques are employed in the compilation process to adapt computation operations to the limitations of a specific hardware device. For example, a targeting hardware device can include a computing unit associated with limited on-chip memory. For a specific computation (such as a convolution operation), the corresponding input data and filter weights cannot be loaded to the targeting hardware at once. Thus, the input data and/or weights can be partitioned into suitable tiles to adapt to the property of the targeting hardware. The resulting tiles of input data and weights can be processed subsequently sequentially. In some examples, a targeting hardware device can include multiple processing cores. Accordingly, input data and weights of a computation can be suitably partitioned for parallel processing to accelerate the respective computation.

In some examples, tiling techniques are combined with fusion techniques for optimizing a group of related computations. For example, multiple layers of a convolution neural network (CNN) can be fused into one fused computation operation to reduce off-chip data movement. To enable such a fusion optimization, input data (input tensor) can be partitioned into tiles according to the limitations of the on-chip memory configuration of a targeting hardware device. The tiles of the input data can be sequentially fed to the targeting hardware device or to multiple cores of the targeting device in parallel.

When the tiling techniques are employed as in the above examples, tiles of output data can be generated corresponding to the tiles of input data. Sizes of the tiles of input data and output data corresponding to a specific computation (fused or not fused) can be determined for a targeting hardware device. In addition, as a result of the compilation process to generate the hardware-optimized IR 113, a hardware command (or machine executable code) can be generated corresponding to each output tile (or input tile) for the corresponding computation operation (fused or not fused).

The following references provide additional examples for employing tiling techniques in deep learning compilation: (1) M. Alwani, H. Chen, M. Ferdman and P. Milder, "Fused-layer CNN accelerators," 2016 49th Annual IEEE/ACM International Symposium on Microarchitecture (MICRO), Taipei, Taiwan, 2016, pp. 1-12. (2) Jangda, Abhinav and Uday Bondhugula. "An effective fusion and tile size model for optimizing image processing pipelines," Proceedings of the 23rd ACM SIGPLAN Symposium on Principles and Practice of Parallel Programming (2018). The references are incorporated by reference herein in their entirety.

As a result of the static-shape oriented compilation process, the hardware-optimized IR 113 (or the low-level IR 113) can be generated. The hardware-optimized IR 113 can include model parameters of the static shape model 112. The original static shape model 112 can be modified due to various optimizations of the compilation process. Thus, all or a part of the original model parameters of the static shape model 112 can be changed in the hardware-optimized IR 113. The model parameters can include weights, constants, and the like.

The hardware-optimized IR 113 can further include information (structure information) about the structure of the optimized static shape model 112. For example, the structure of the static shape model 112 can be represented by a graph. Computation operations (or computation operators) can be represented by nodes in the graph. The nodes can be connected by connections (or edges/links) that represent the data flow in the graph. For example, a connection can represent that the output from a preceding node is consumed as an input to the next node. During the compilation process, the structure of the static shape model 112 can be optimized and changed. Thus, the structure of the optimized static shape model 112 in the hardware-optimized IR 113 can be different from the structure of the original static shape model 112.

The hardware-optimized IR 113 can further include templated hardware commands resulting from the tiling operations in the compilation process. As described above, input data (input tensor) or output data (output tensor) associated with a computation operation (fused or not fused) can be partitioned into tiles. The computation operation may include a plurality of sub-computation operations. Accordingly, a set of machine code (referred to as a hardware command) can be generated for implementing the computation operation and shared among different tiles as a result of the compilation process. Such hardware command can be referred to as a templated command corresponding to a specific computation operation. The templated command can have a few parameters (or referred to as fields) that can be specific to a respective runtime tile. The templated command can also have the set of machine code that is common for different tiles. For example, the few parameters (or fields) can include parameters related to memory address allocations, register configuration values, and the like.

The hardware-optimized IR 113 can have multiple computation operations. In some examples, not all of the computation operations undergo the tiling operations. For the different computation operations undergoing tiling operations, the respective input or output tensor may be tiled differently, resulting in different tile sizes. For example, a tensor with a dimension of (x, y, z) can be partitioned into tiles of the same dimension of (x/2, y/2, z/2), (x/2, y, z), (x, y/8, z/16), and the like. Or, the resulting tiles may overlap around a border of two neighboring tiles. When generating machine code, for different computation operations, different templated hardware commands can be generated.

After the static-shape oriented compilation process generating the hardware-optimized IR 113 (the low-level IR 113), an extracting step can be performed to generate a compiled result 116. Specifically, the model parameters can be extracted from the low-level IR 113 (shown as model parameters 114 in FIG. 1) and included (or stored) in the compiled result 116.

Additionally, a set of so-called metadata 115 can be extracted from the low-level IR 113 and included in the compiled result 116. The metadata 115 can include model structure information extracted (or generated) from the structure information of the optimized static shape model 112 in the hardware-optimized IR 113. The metadata 115 can further include templated commands corresponding to the tiling operations performed for the respective computation operations in the hardware-optimized IR 113. In some examples, the extracted model structure information is serialized according to the directions of data flows of the model structure in the low-level IR 113 and stored in the compiled result 116. The templated commands can be associated with the corresponding computation operations and stored in the compiled result 116. The metadata 115 includes partial information extracted from the low-level IR 113 and thus can be referred to as a light-lower IR.

The hardware-optimized IR 113 can be used to generate optimized machine codes and contain lots of complex data structures and functions. Thus, the hardware-optimized IR 113 can have a large storage size. By only extracting the necessary information from the hardware-optimized IR 113, the size of the compiled result 116 can be minimized. Memory usage in runtime for saving the compiled result 116 can be saved.

Following the compile phase 110, the run phase 120 of the inference process 100 can be performed. For example, a video processing application can be executed on a mobile device and receive a to-be-processed video. The video processing application determines to use a deep learning tool to process the video. Accordingly, the video processing application may start to run the light compiler. The light compiler can receive a copy of the compiled result 116, shown as the compiled result 121, as an input. The light compiler restores metadata 122 from the compiled result 121. The metadata 122 can be a copy of the metadata 116. The video can include a sequence of pictures having a size 123 of 480×540 pixels. Accordingly, the light compiler can receive an actual input shape 124 of 480×540 pixels as another input. In an example, each picture may include multiple color components, such as 2 chroma components and a luma component. Accordingly, the input tensor can have an input shape of 3×480×540 pixels.

The light compiler can use the model structure information in the metadata 122 to rebuild a deep learning model, for example, in a form of a graph. The graph can include nodes of computation operations and connections (edges/links) indicating data flows among the computation operations. Also, the light compiler can identify computation operations that employ tiling techniques. Based on the model structure represented in the graph and the actual input tensor shape, in an embodiment, the light compiler can determine output tensor shapes corresponding to the computation operations, respectively. FIG. 1 shows a new output shape 125 that may correspond to one of the multiple computations. In some embodiments, the operation of rebuilding the deep learning model can be skipped. The compiler can derive the output tensor shapes of the respective computation operations using the model structure information in the metadata 122 without relying on a graph representation.

Based on the output tensor shapes, tiling operations can be performed to partition the output tensors of the computation operations that employ tiling techniques. For example, during the compile phase 110, each of these computation operations may have a specific tile size or specific tiling method. Such tile size or tiling method information can be recorded in the compiled result 121 (or 116). Using the tile size or tile method of a specific computation operation, the respective runtime output tensor can be tiled into tiles. As the actual input shape 123 may vary for videos with different picture sizes, the runtime output tensor shapes may also vary for different actual input shapes 123. Accordingly, for a specific computation operation and the associated tile size, the number of tiles may vary along with the input picture sizes.

In the next step, the light compiler can fetch the templated commands 126 from the method data 122. Each templated command can correspond to a specific computation operation that employs a tiling technique in the rebuilt deep learning model. Corresponding to a set of tiles resulting from the same computation operation, a templated command can be shared by the set of tiles.

In the next step, for each computation operation, the templated command corresponding to each tile can be patched together to form a set of runnable hardware commands 127. For example, for a specific computation operation, the fields or parameters of each templated hardware command can be filled with specific values, for example, to specify memory addresses, memory offsets, register values, and the like. The runnable hardware commands 127 for different computation operations can be combined to form an executable program. The executable program can be machine-executable binary code, code of assembly languages, or the like. In some examples, the executable program may further include other machine code generated for computation operations other than the ones employing the tiling techniques.

As shown, the light compilation 128 mainly includes deriving new output shapes 125, tiling output tensors, and patching templated commands. Those operations can be performed quickly. The time-consuming front-end and back-end optimizations performed in the heavy compilation 110 are avoided. Accordingly, the light compilation 128 can be faster than the heavy compilation 110, significantly reducing the delay caused by heavy compilation.

After the light compilation 128, the executable program can be run to process the video with the input picture size 123. This step is labeled with a numeral of 129. As shown, for pictures with the same input picture size 123 or the same actual input shape 124 in a picture sequence, the pictures can be processed one by one by repeatedly running the executable program to infer each picture.

The to-be-processed video may include picture sequences with varying input picture sizes. When the video processing application detects a new input picture size 130 (or a different input shape) of 540×960 pixels different from the original input picture size 123, for example, the light compilation 128 can be triggered again with the new input shape. This step of the inference process 100 is represented by the arrow 131 in FIG. 1. The switch between different input picture sizes can happen in real time due to the fast light compilation process.

Figure 2:
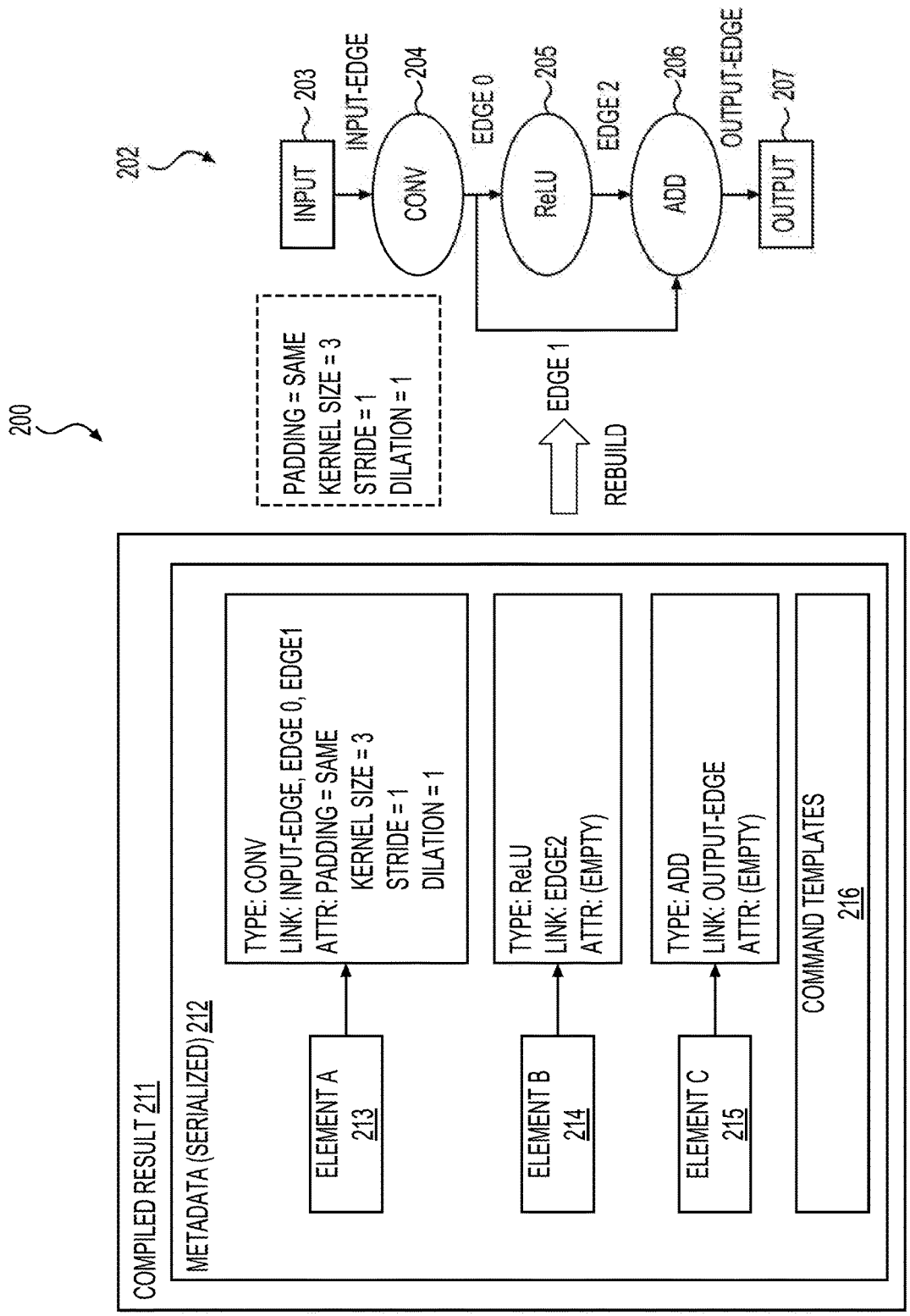
FIG. 2 shows an example 200 of rebuilding a deep learning model based on metadata according to an embodiment of the disclosure.

FIG. 2 shows an example 200 of rebuilding a deep learning model based on metadata according to an embodiment of the disclosure. A compiled result 211 is shown on the left side of FIG. 2. The compiled result 211 can be generated from a heavy compilation process such as that performed in the compile phase 110 in the FIG. 1 example. The compiled result 211 can contain a set of metadata 212. The metadata 212 can include a plurality of elements, such as element A 213, element B 214, and element C 215. These elements 213-215 can include information indicating a structure of a hardware-optimized deep learning model. These elements can be arranged in a serialized way according to a certain order. A light compiler can derive the hardware-optimized deep learning model or a portion thereof based on the elements 213-215. The metadata 212 can further include command templates (or referred to as templated commands) 216.

Some of the elements can each have a set of properties. For example, elements A/B/C 213-215 each have three properties: type, link, and attribute (Attr). The type property can indicate a computation operation corresponding to the respective element. As shown, according to the values of the type properties, element A 213 corresponds to a convolution operation (or referred to as operator/tensor function); element B 214 corresponds to a ReLU operation; and element C 215 corresponds to an add operation. The link property can indicate one or more edges (or connections/data flows) associated with the respective element or computation. As shown, according to the values of the link properties, element A 213 has three edges: an input-edge, an edge0, and an edge1; element B 214 has an edge2; and element C 215 has an output-edge. The attribute property can indicate a set of parameters associated with the respective element. As shown, element A 213 has 4 associated parameters: padding=same, kernel size=3, stride=1, and dilation=1. Elements B/C 214/215 do not have any attribute parameters.

A light compiler can interpret the metadata 212 to rebuild a deep learning model or a portion of the deep learning model (such as one or more fused or not fused operations). For example, the rebuilt model or operations can be represented as a graph. As an example, a graph representation 202 of the rebuilt computation operations is shown on the right side of FIG. 2. The graph representation 202 can include 3 computation operations arranged in a sequence: a convolution operation 204, a ReLU operation 205, and an add operation 206. The 3 computation operations receive an input 203 and generate an output 207. It is noted that the graph representation 202 can be understood to be a deep learning model or an operation (e.g., a fused operation) of a deep learning model. The techniques disclosed herein, including model or operation rebuilding, output shape derivation, output tensor tiling, and templated command patching, can be applied to a whole deep learning model or one or more operations (fused or not fused) of a deep learning model.

During the rebuild process, the light compiler can determine there is the convolution operation 204 and the convolution operation 204 has an input edge and two output edges (edge0 and edge1), according to element A 203 of the metadata 212. The light compiler can further determine or derive there is the ReLU operation 205 and the ReLU operation 205 has an output edge (edge2) and use the first output edge (edge0) as an input edge, according to element B 204 and the preceding element A 203. The light compiler can further determine or derive there is the add operation 206 and the add operation 206 has an output edge and use the second output edge (edge1) of the convolution operation 204 and the output edge (edge2) of the ReLU operation 204 as two input edges, according to the preceding element A 203 and element B 204.

Figure 3:
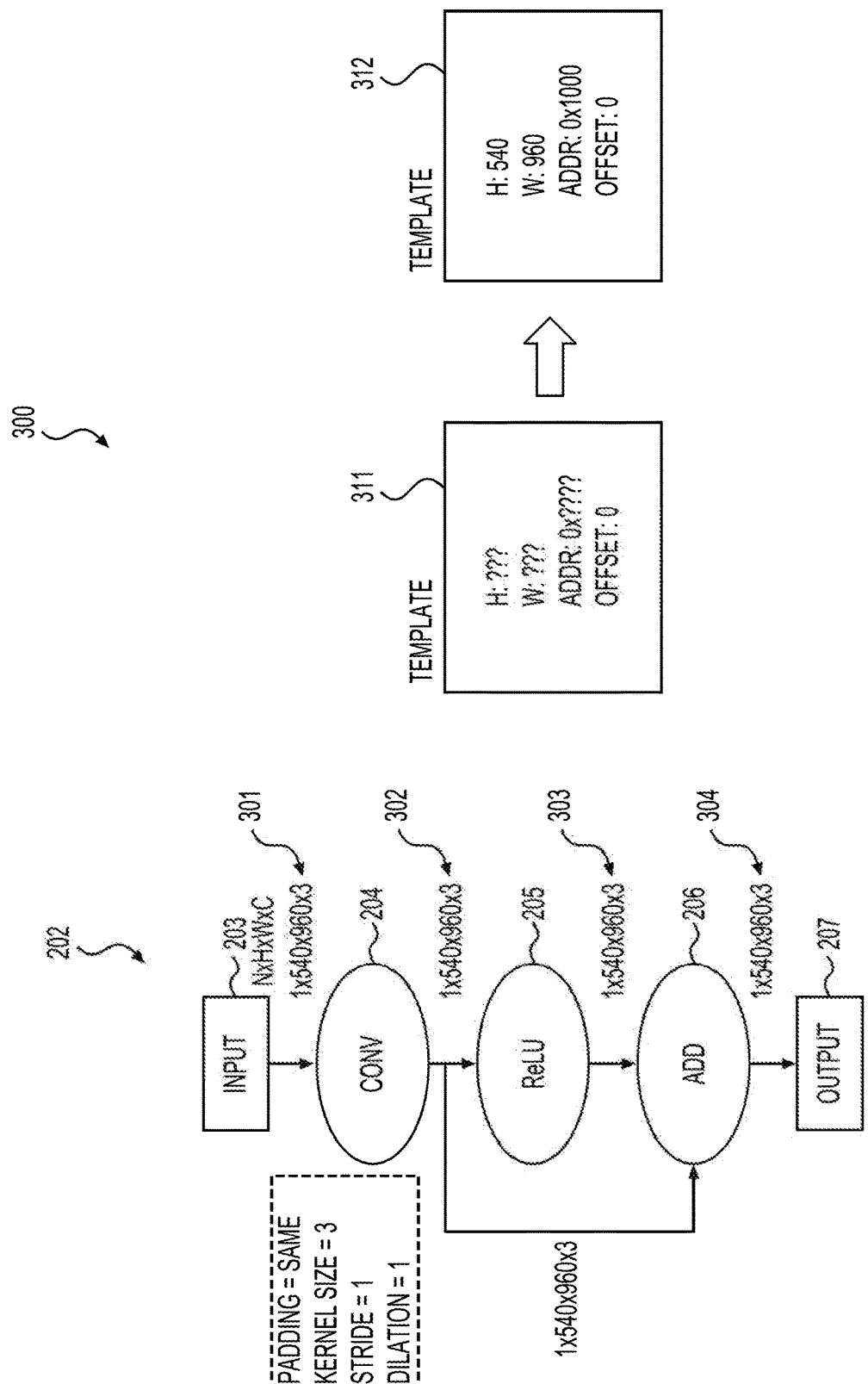
FIG. 3 shows an example of output shape derivation and tiling/patching operations according to an embodiment of the disclosure.

FIG. 3 shows an example of output shape derivation and tiling/patching operations according to an embodiment of the disclosure. The graph representation 202 of the rebuilt computation operations in FIG. 2 is used as an example for explanation. The graph representation 202 is shown on the left side of FIG. 3.

$$H_{out} = \left\lfloor \frac{H_{in} + 2 \times \text{padding}[0] - \text{dilation}[0] \times (\text{kenel}_{size}[0] - 1) - 1}{\text{stride}[0]} + 1 \right\rfloor =$$
$$\left\lfloor \frac{540 + 2 \times 1 - 1 \times (3 - 1) - 1}{1} + 1 \right\rfloor =$$
$$540 W_{out} = \left\lfloor \frac{W_{in} + 2 \times \text{padding}[0] - \text{dilation}[1] \times (\text{kenel}_{size}[1] - 1) - 1}{\text{stride}[1]} + 1 \right\rfloor =$$
$$\left\lfloor \frac{960 + 2 \times 1 - 1 \times (3 - 1) - 1}{1} + 1 \right\rfloor = 960$$

With the graph representation 202 of the operations 204-206 being available, the light compiler can determine an output shape (a shape of an output tensor) 304 based on an input shape (a shape of an input tensor) 301. The input shape 301 can be expressed as follows:

$$H_{out} = \left\lfloor \frac{H_{in} + 2 \times \text{padding}[0] - \text{dilation}[0] \times (\text{kenel}_{size}[0] - 1) - 1}{\text{stride}[0]} + 1 \right\rfloor =$$
$$\left\lfloor \frac{540 + 2 \times 1 - 1 \times (3 - 1) - 1}{1} + 1 \right\rfloor =$$
$$540 W_{out} = \left\lfloor \frac{W_{in} + 2 \times \text{padding}[0] - \text{dilation}[1] \times (\text{kenel}_{size}[1] - 1) - 1}{\text{stride}[1]} + 1 \right\rfloor =$$
$$\left\lfloor \frac{960 + 2 \times 1 - 1 \times (3 - 1) - 1}{1} + 1 \right\rfloor = 960 \; N \times H \times W \times C =$$

Batch size × Kernel height × Kernel width × Chanel number $$H_{out} = \left\lfloor \frac{H_{in} + 2 \times \text{padding}[0] - \text{dilation}[0] \times (\text{kenel}_{size}[0] - 1) - 1}{\text{stride}[0]} + 1 \right\rfloor =$$
$$\left\lfloor \frac{540 + 2 \times 1 - 1 \times (3 - 1) - 1}{1} + 1 \right\rfloor =$$
$$540 W_{out} = \left\lfloor \frac{W_{in} + 2 \times \text{padding}[0] - \text{dilation}[1] \times (\text{kenel}_{size}[1] - 1) - 1}{\text{stride}[1]} + 1 \right\rfloor =$$
$$\left\lfloor \frac{960 + 2 \times 1 - 1 \times (3 - 1) - 1}{1} + 1 \right\rfloor = 960 = 1 \times 540 \times 960 \times 3.$$

$$H_{out} = \left\lfloor \frac{H_{in} + 2 \times \text{padding}[0] - \text{dilation}[0] \times (\text{kenel}_{size}[0] - 1) - 1}{\text{stride}[0]} + 1 \right\rfloor =$$
$$\left\lfloor \frac{540 + 2 \times 1 - 1 \times (3 - 1) - 1}{1} + 1 \right\rfloor =$$
$$540 W_{out} = \left\lfloor \frac{W_{in} + 2 \times \text{padding}[0] - \text{dilation}[1] \times (\text{kenel}_{size}[1] - 1) - 1}{\text{stride}[1]} + 1 \right\rfloor =$$
$$\left\lfloor \frac{960 + 2 \times 1 - 1 \times (3 - 1) - 1}{1} + 1 \right\rfloor = 960$$

Accordingly, based on the attribution parameters associated with the convolution operation 204, an output shape 302 of the convolution operation 204 can be calculated as follows:

$$H_{out} = \left\lfloor \frac{H_{in} + 2 \times \text{padding}[0] - \text{dilation}[0] \times (\text{kenel}_{size}[0] - 1) - 1}{\text{stride}[0]} + 1 \right\rfloor =$$

-continued $$540W_{out} = \left\lfloor \frac{540 + 2 \times 1 - 1 \times (3-1) - 1}{1} + 1 \right\rfloor =$$

$$540W_{out} = \left\lfloor \frac{W_{in} + 2 \times \text{padding}[0] - \text{dilation}[1] \times (\text{kenel}_{size}[1] - 1) - 1}{\text{stride}[1]} + 1 \right\rfloor =$$

$$\left\lfloor \frac{960 + 2 \times 1 - 1 \times (3-1) - 1}{1} + 1 \right\rfloor = 960$$

$$H_{out} = \left\lfloor \frac{H_{in} + 2 \times \text{padding}[0] - \text{dilation}[0] \times (\text{kenel}_{size}[0] - 1) - 1}{\text{stride}[0]} + 1 \right\rfloor =$$

$$\left\lfloor \frac{540 + 2 \times 1 - 1 \times (3-1) - 1}{1} + 1 \right\rfloor =$$

$$540W_{out} = \left\lfloor \frac{W_{in} + 2 \times \text{padding}[0] - \text{dilation}[1] \times (\text{kenel}_{size}[1] - 1) - 1}{\text{stride}[1]} + 1 \right\rfloor =$$

$$\left\lfloor \frac{960 + 2 \times 1 - 1 \times (3-1) - 1}{1} + 1 \right\rfloor = 960$$

$$H_{out} = \left\lfloor \frac{H_{in} + 2 \times \text{padding}[0] - \text{dilation}[0] \times (\text{kenel}_{size}[0] - 1) - 1}{\text{stride}[0]} + 1 \right\rfloor =$$

$$\left\lfloor \frac{540 + 2 \times 1 - 1 \times (3-1) - 1}{1} + 1 \right\rfloor =$$

$$540W_{out} = \left\lfloor \frac{W_{in} + 2 \times \text{padding}[0] - \text{dilation}[1] \times (\text{kenel}_{size}[1] - 1) - 1}{\text{stride}[1]} + 1 \right\rfloor =$$

$$\left\lfloor \frac{960 + 2 \times 1 - 1 \times (3-1) - 1}{1} + 1 \right\rfloor = 960$$

The batch size and the channel number of the output shape 302 can be the same as the input shape 301. Thus, the output shape 302 can be 1×540×960×3.

The ReLU operation 205 and the add operation 206 do not change the shape of an input tensor. Accordingly, the output shape 304 of the operations 204-206 can be determined to be 1×540×960×3.

With the output shape 304 available, the light compiler can accordingly perform a tiling operation. During the compile phase 110, a tile size can have been determined corresponding to a respective computation operation (the computations 204-206 in FIG. 3). The dimensions of the tile size (one or multiple dimensions) can be used to perform an evaluation. If the output tensor shape 304 can be contained within one tile, no partition is performed. The output tensor of the operations 204-206 is treated as one tile. If the output tensor shape 304 cannot be contained within one tile, the output tensor will be partitioned. In this way, the tensor (or tile) shape can be adjusted to satisfy the hardware limitations (such as on-chip memory sizes).

In the FIG. 3 example, the output shape 304 can be contained in one tile. Accordingly, one empty command template 311 is obtained from the metadata 212 and converted to a filled template 312. As shown, the empty template 311 can include several fields with undecided values: H (tile height), W (tile width), Addr (memory address), and Offset (memory address offset). In the filled template 312, these fields are assigned with specific values: H (540), W (960), Addr (0x1000), and Offset (0).

It is noted that, command templates in different examples can have different formats or include different fields. Forms of theses command templates are not necessarily the same as or similar to that of the FIG. 3 example. Further, the FIG. 3 example uses the graph representation 202 for output tensor shape derivation. However, in other examples, no graph representation is used. Other means or formats for representing a structure of a deep learning model or computations may be used for indicating operations and orders of respective operations. The output tensor size can thus be determined based on such means or formats. Or, the output tensor size can be derived by directly using information stored in the metadata 212 without the step of rebuilding the operations 204-206 or the order of the operations 204-206.

Figure 4:
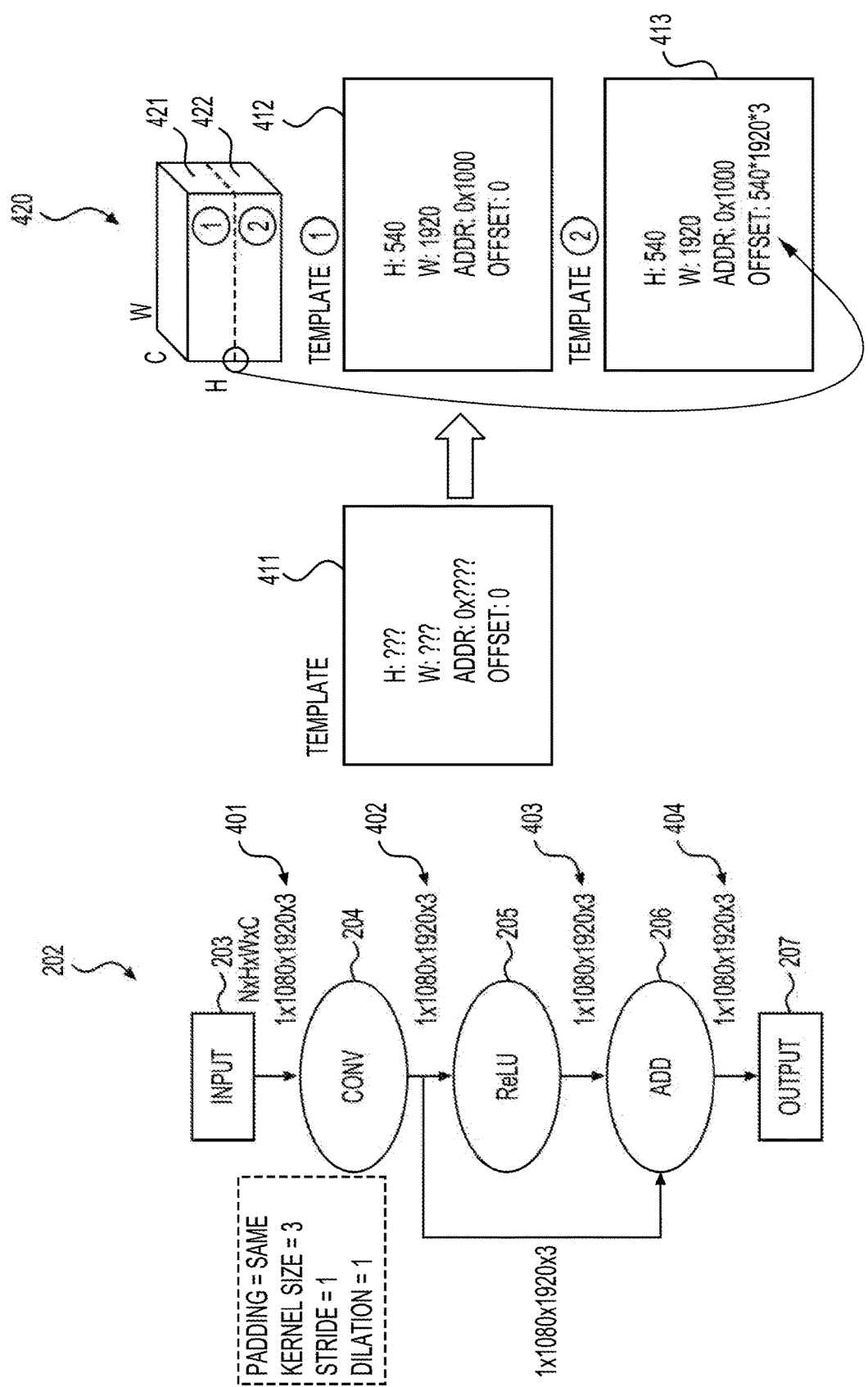
FIG. 4 shows another example 400 of output shape derivation and tiling/patching operations according to an embodiment of the disclosure.

FIG. 4 shows another example 400 of output shape derivation and tiling/patching operations according to an embodiment of the disclosure. The graph representation 202 of the rebuilt operations in FIG. 2 is still used as an example for explanation. The graph representation 202 is shown on the left side of FIG. 4.

Similarly, with the paragraph representation 202, the light compiler can determine output tensor shapes 402-404 corresponding to the operations 204-206 based on an input shape 401. These tensor shapes 401-404 have a same dimension of 1×1080×1920×3.

The light compiler can then perform a tiling operation. For example, the light compiler can compare the output tensor shape 404 with the tile shape predetermined during the compile phase 110 to determine how to tile the output tensor from the add operation 206. A three-dimensional (3D) form 420 of the output tensor is shown. The light compiler decides to partition the output tensor into two tiles 421-422 each of a shape of 1×540×1920×3. The two tiles 421-422 can each have a shape equal to or smaller than the predetermined tile shape from the compile phase 110.

With the tiles decided, the light compiler can perform a patching operation. For example, an empty command template 411 corresponding to the operations 204-206 can be fetched from the metadata 212. Based on the tile size information of the tiles 421-422, the fields in the command template 411 can be filled to generate two filled templates 412-413 for the two tiles 421-422, respectively. As shown, the filled template 412 has the following field values: H (540), W (1920), Addr (0x1000), and Offset (0). The filled template 413 has the following field values: H (540), W (1920), Addr (0x1000), and Offset (540*1920*3). The templates 412 or 413 can indicate the respective tile size (output tensor shape after tiling) and the memory location for storing the respective partitioned output tensors. The templates 412-413 can include or be associated with a same set of machine code for processing the corresponding computation operations 204-206.

It is noted that the templates 411-413 are merely examples. In various embodiments, a command template can be designed to include any number or types of fields to contain any parameter values suitable for generating runnable machine code.

Figure 5:
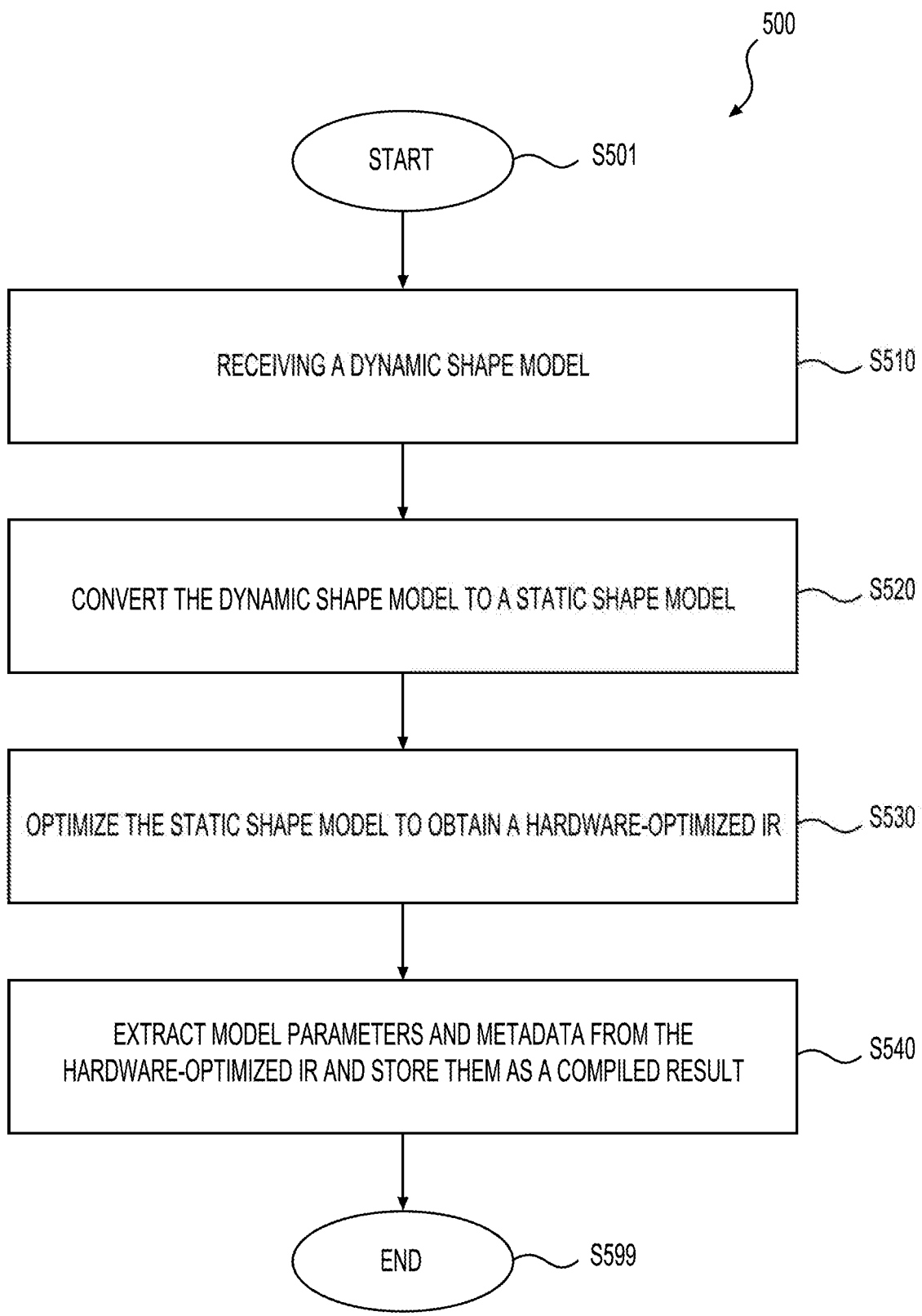
FIG. 5 shows a compile phase process 500 according to embodiments of the disclosure.

FIG. 5 shows a compile phase process 500 according to embodiments of the disclosure. The compile phase process 500 can also be referred to as a heavy compilation process in the disclosure. The process 500 starts from S501 and proceeds to S510.

At S510, a dynamic shape model can be received at a heavy compiler. The dynamic shape model can have parameters specifying an input tensor shape with unknown (or undecided) tensor dimension values. In an example, the dynamic shape model has the dynamic characteristics while being trained in a deep learning training process. In an example, the dynamic shape model is obtained by modifying a static shape model. For example, after a static shape model is trained through a deep learning training process, the parameters specifying input tensor dimensions can be modified from known values to undecided values (e.g., represented by ?). The heavy compiler can understand a two-phase compilation process (including a heavy compilation and a light compilation) is to be performed by identifying the parameters with undecided values. Subsequently, the heavy compiler can perform the process 500 to generate a compiled result containing metadata and model parameters.

At S520, the dynamic shape model can be converted to a static model. For example, the parameters used for specifying the input tensor shape can be assign concrete values.

In an example, the heavy compiler can directly receive a static shape model. Accordingly, the steps of S510 and S520 can be skipped.

At S530, the static shape model can be optimized to obtain a hardware-optimized IR. For example, various front-end and back-end optimization techniques can be employed in a static-shape oriented compilation process targeting a specific hardware platform. Tiling and fusion techniques can be used for the optimization.

At S540, model parameters (e.g., weights and constants) and metadata can be extracted from the hardware-optimized IR and stored a compiled result. The process 500 can proceed to S599 and terminate at S599.

Figure 6:
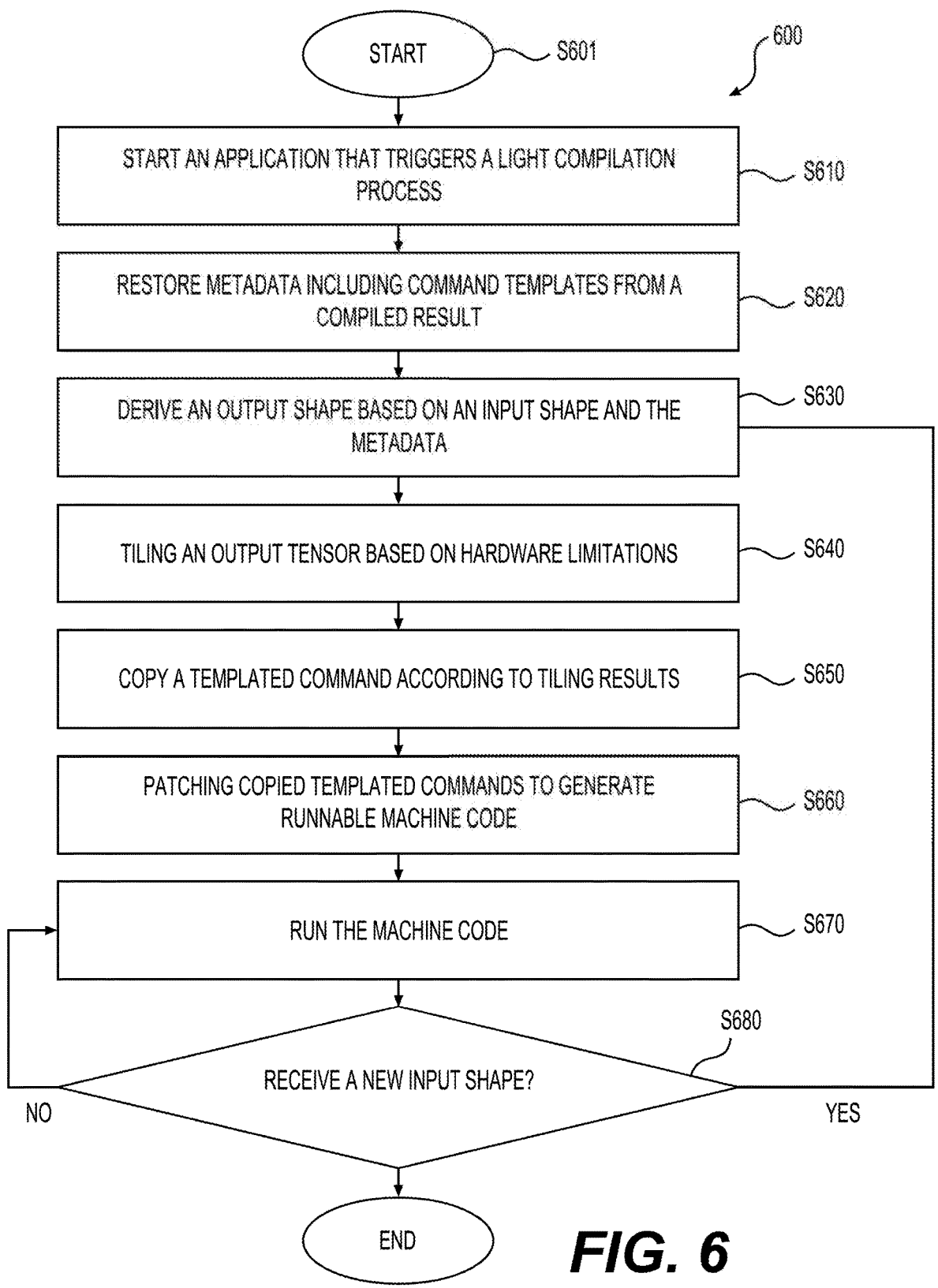
FIG. 6 shows a run phase process 600 according to embodiments of the disclosure.

FIG. 6 shows a run phase process 600 according to embodiments of the disclosure. The process 600 can start from S601 and proceed to S610.

At S610, an application can be started in response to a user request for performing a task using a deep learning model. For example, the task can be to process a video using a super resolution deep learning algorithm. The application can trigger a light compiler to perform a light compilation process. For example, the light compilation process can include the steps of S620-S660.

At S620, metadata including command templates can be restored from a compiled result by the light compiler. At S630, an output shape of a specific operation or the deep learning model can be derived based on an input shape and the metadata. In various examples, there can be multiple computation operations in the deep learning model that employ tiling techniques. Accordingly, for each such computation operation, an output shape can be derived.

At S640, an output tensor of the specific operation or the deep learning model can be tiled based limitations of a targeting hardware platform. For the scenario that multiple computation operations in the deep learning model that employ tiling techniques, the respective output tensor can be tiled for each such computation operation.

At S650, a templated command can be copied from the compiled result according to the tiling results of S640. For example, a copy of the templated command can be obtained for each tile for the specific operation or the deep learning model. Multiple tiles can have multiple templated commands, respectively. For the scenario that multiple computation operations in the deep learning model that employ tiling techniques, each computation operation can have its own templated command copied for the respective tiles.

At S660, the copied templated commands for the specific computation or the deep learning model can be patched together to generate runnable machine code. For example, the fields for indicating a tile size and memory address of output or input tensor data in a templated command can be assigned with concrete values. These filled template commands can be combined to form executable machine code. The resulting machine code may further include other types of code, for example, such as code for computation operations that do not employ the tiling techniques, or any other code necessary for implementing the respective deep learning model.

At S670, the machine code resulting from the light compilation process can be run to process the video. At S680, whether a new input shape is received is determined. For example, the video may include multiple sequences of pictures. Each sequence of pictures may have different picture size. Also, the picture sizes may vary from time to time. The application can monitor if a sequence of pictures with a new picture size arrives. For pictures with a same picture size as the original input shape in S630, the process 600 can return to S670. For pictures with a new picture size different than the original input shape in S630, the process can return to S630. From S630, the light compilation process can be repeated based on the new input shape. The process 600 can be continued until the end of the video.

In various embodiments, deployment of the compile-phase heavy compilation and the run-phase light compilation can vary. In a first scenario, a distributed deployment can be employed. For example, the run-phase light compilation can be deployed in a local device, such as a mobile device (e.g., a smartphone, a laptop, and the like), together with an application that can call the light compiler. The heavy compilation can be deployed in a remote device, such as a server in a cloud. A respective heavy compilation process can be performed when an updated deep learning model is available. The resulting compiled result can be transmitted and stored in the local device for later use, via a communication network. In a second scenario, both the heavy compilation and the light compilation can be deployed in a local device, such as a mobile device. An updated deep learning model can be transmitted to the local device. A local application can run a heavy compiler to process the deep learning model to obtain a compiled result. The compiled result can be store locally for future use.

The Table below show experimental results for comparison of compilation times. Two deep learning models, Model 1 and model 2, are tested. For Model 1, the time for a heavy compilation is 5 seconds, and the time for a light compilation in run time is about 1.6 milliseconds. The runtime processing is speeded up 3125 times. For Model 2, the time for a heavy compilation is 22 seconds, and the time for a light compilation in run time is about 1.6 milliseconds. The runtime processing is speeded up 13750 times. As shown, the delay for handling input tensor shape variations is significantly decreased, enabling a real-time application for handling dynamic input shapes.

Figure 7:
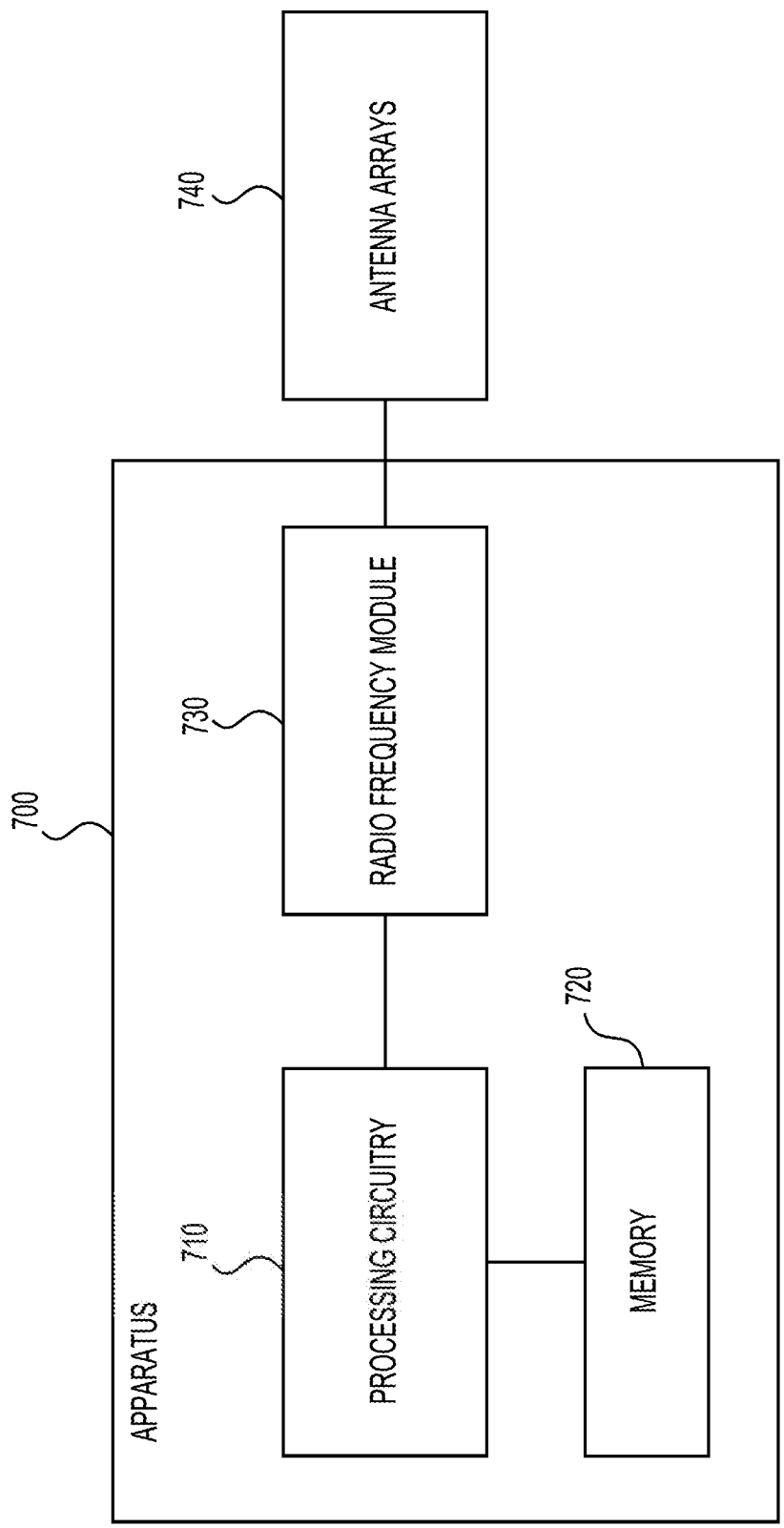
FIG. 7 shows an apparatus 700 according to embodiments of the disclosure. The apparatus 700 can be configured to perform various functions in accordance with one or more embodiments or examples described herein.

FIG. 7 shows an apparatus 700 according to embodiments of the disclosure. The apparatus 700 can be configured to perform various functions in accordance with one or more embodiments or examples described herein. Thus, the apparatus 700 can provide means for implementation of mechanisms, techniques, processes, functions, components, systems described herein. For example, the apparatus 700 can be used to implement functions of a mobile device or a server in various embodiments and examples described herein. The apparatus 700 can include a general-purpose processor or specially designed circuits to implement various functions, components, or processes described herein in various embodiments. The apparatus 700 can include processing circuitry 710, a memory 720, and optionally a radio frequency (RF) module 730.

In various examples, the processing circuitry 710 can include circuitry configured to perform the functions and processes described herein in combination with software or without software. In various examples, the processing circuitry 710 can be a digital signal processor (DSP), an application-specific integrated circuit (ASIC), programmable logic devices (PLDs), field programmable gate arrays (FPGAs), digitally enhanced circuits, GPU, CPU, or comparable device or a combination thereof.

In some examples, the processing circuitry 710 can be a central processing unit (CPU) configured to execute program instructions to perform various functions and processes described herein. Accordingly, the memory 720 can be configured to store program instructions. The processing circuitry 710, when executing the program instructions, can perform the functions and processes. The memory 720 can further store other programs or data, such as operating systems, application programs, and the like. The memory 720 can include non-transitory storage media, such as a read-only memory (ROM), a random-access memory (RAM), a flash memory, a solid-state memory, a hard disk drive, an optical disk drive, and the like.

In an embodiment, the RF module 730 receives a processed data signal from the processing circuitry 710 and converts the data signal to beamforming wireless signals that are then transmitted via antenna arrays 740, or vice versa. The RF module 730 can include a digital-to-analog converter (DAC), an analog-to-digital converter (ADC), a frequency-up-converter, a frequency-down-converter, filters and amplifiers for reception and transmission operations. The RF module 730 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 740 can include one or more antenna arrays.

The apparatus 700 can optionally include other components, such as input and output devices, additional or signal processing circuitry, and the like. Accordingly, the apparatus 700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer-readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random access memory (RAM), a read-only memory (ROM), a magnetic disk and an optical disk, and the like. The computer-readable non-transitory storage medium can include all types of computer-readable medium, including magnetic storage medium, optical storage medium, flash medium, and solid-state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of compiling a deep learning model, comprising:
   reading metadata from a compiled result, the metadata being extracted from a low-level intermediate representation (IR) generated from a deep learning compilation process for compiling the deep learning model, the metadata indicating a structure of the deep learning model corresponding to the low-level IR, the structure including computation operations and connections connecting the computation operations;
   receiving shape information of an input tensor of the deep learning model;
   determining a shape of an output tensor of a first computation operation of the computation operations based on the shape information of the input tensor of the deep learning model and the structure of the deep learning model;
   tiling the output tensor of the first computation operation into one or more tiles according to the shape of the output tensor of the first computation operation and hardware limitations of a processor executing the deep learning model; and
   patching one or more copies of a templated hardware command into executable hardware commands, the one or more copies of the templated hardware command corresponding to the one or more tiles, respectively, the templated hardware command being part of the metadata and corresponding to the first computation operation.

2. The method of claim 1, wherein the compiled result includes the metadata and model parameters of the deep learning model.

3. The method of claim 1, further comprising:
   executing the executable hardware commands on the processor to process a first sequence of pictures in a video, the first sequence of pictures having a first picture size corresponding to the shape information of the input tensor;
   in response to detecting a second sequence of pictures having a second picture size in the video different from the first picture size to be processed using the deep learning model, performing the steps of determining the shape of the output tensor of the first computation operation of the computation, determining how to tile the output tensor of the first computation operation, and patching the one or more copies of the templated hardware command to generate new executable hardware commands, with the second picture size used as the shape information of the input tensor; and
   executing the new executable hardware commands to process the second sequence of pictures in the video.

4. The method of claim 1, wherein the patching the one or more copies of the templated hardware command into the executable hardware commands includes:
   modifying a field of the respective copy of the templated hardware command, the field including one of
   a memory address corresponding to hardware commands of the first computation operation, a memory offset corresponding to the respective copy of templated hardware command, and a register value for filling a register of the processor.

5. The method of claim 1, further comprising:

receiving the deep learning model that is a dynamic shape model;

converting the dynamic shape model into a static shape model;

optimizing the static shape model to generate a low-level intermediate representation (IR) that is a hardware-optimized IP targeting the processor;

extracting the metadata from the low-level IR; and storing the metadata and model parameters of the deep learning model as the compiled result.

6. The method of claim 5, wherein the optimizing the static shape model to generate the low-level IR includes:

tiling an output tensor of the first computation operation based on the hardware limitations of the processor executing the deep learning model; and generating the templated hardware command corresponding to each tile resulting from the tiling.

7. The method of claim 5, further comprising:

transmitting the compiled result including the metadata and model parameters of the deep learning model to a mobile device containing the processor.

8. An apparatus of deep learning model compilation, comprising circuitry configured to:

read metadata from a compiled result, the metadata being extracted from a low-level intermediate representation (IR) generated from a deep learning compilation process for compiling the deep learning model, the metadata indicating a structure of the deep learning model corresponding to the low-level IR, the structure including computation operations and connections connecting the computation operations;

receive shape information of an input tensor of the deep learning model;

determine a shape of an output tensor of a first computation operation of the computation operations based on the shape information of the input tensor of the deep learning model and the structure of the deep learning model;

tile the output tensor of the first computation operation into one or more tiles according to the shape of the output tensor of the first computation operation and hardware limitations of a processor executing the deep learning model; and patch one or more copies of a templated hardware command into executable hardware commands, the one or more copies of the templated hardware command corresponding to the one or more tiles, respectively, the templated hardware command being part of the metadata and corresponding to the first computation operation.

9. The apparatus of claim 8, wherein the compiled result includes the metadata and model parameters of the deep learning model.

10. The apparatus of claim 8, wherein the circuitry is further configured to:

execute the executable hardware commands on the processor to process a first sequence of pictures in a video, the first sequence of pictures having a first picture size corresponding to the shape information of the input tensor;

in response to detecting a second sequence of pictures having a second picture size in the video different from the first picture size to be processed using the deep learning model, perform the steps of determining the shape of the output tensor of the first computation operation of the computation, determining how to tile the output tensor of the first computation operation, and patching the one or more copies of the templated hardware command to generate new executable hardware commands, with the second picture size used as the shape information of the input tensor; and executing the new executable hardware commands to process the second sequence of pictures in the video.

11. The apparatus of claim 8, wherein the patching the one or more copies of the templated hardware command into the executable hardware commands includes:

modifying a field of the respective copy of the templated hardware command, the field including one of a memory address corresponding to hardware commands of the first computation operation, a memory offset corresponding to the respective copy of templated hardware command, and a register value for filling a register of one of the processor.

12. The apparatus of claim 8, wherein the circuitry is further configured to:

receive the deep learning model that is a dynamic shape model;

convert the dynamic shape model into a static shape model;

optimize the static shape model to generate a low-level intermediate representation (IR) that is a hardware-optimized IR targeting the processor;

extract the metadata from the low-level IR; and storing the metadata and model parameters of the deep learning model as the compiled result.

13. The apparatus of claim 12, wherein the optimizing the static shape model to generate the low-level IR includes:

tiling an output tensor of the first computation operation based on the hardware limitations of the processor executing the deep learning model; and generating the templated hardware command corresponding to each tile resulting from the tiling.

14. The apparatus of claim 8, wherein the circuitry is further configured to:

receive the compiled result including the metadata and model parameters of the deep learning model from a remote computer.

15. A non-transitory computer-readable medium storing instructions that, when executed by a processing circuitry, cause the processing circuitry to perform a method of compiling a deep learning model, the method comprising:

reading metadata from a compiled result, the metadata being extracted from a low-level intermediate representation (IR) generated from a deep learning compilation process for compiling the deep learning model, the metadata indicating a structure of the deep learning model corresponding to the low-level IR, the structure including computation operations and connections connecting the computation operations;

receiving shape information of an input tensor of the deep learning model;

determining a shape of an output tensor of a first computation operation of the computation operations based on the shape information of the input tensor of the deep learning model and the structure of the deep learning model;

tiling the output tensor of the first computation operation into one or more tiles according to the shape of the output tensor of the first computation operation and hardware limitations of a processor executing the deep learning model; and patching one or more copies of a templated hardware command into executable hardware commands, the one or more copies of the templated hardware command corresponding to the one or more tiles, respectively, the templated hardware command being part of the metadata and corresponding to the first computation operation.

16. The non-transitory computer-readable medium of claim 15, wherein the compiled result includes the metadata and model parameters of the deep learning model.

17. The non-transitory computer-readable medium of claim 15, wherein the method further comprises:

executing the executable hardware commands on the processor to process a first sequence of pictures in a video, the first sequence of pictures having a first picture size corresponding to the shape information of the input tensor;

in response to detecting a second sequence of pictures having a second picture size in the video different from the first picture size to be processed using the deep learning model, performing the steps of determining the shape of the output tensor of the first computation operation of the computation, determining how to tile the output tensor of the first computation operation, and patching the one or more copies of the templated hardware command to generate new executable hardware commands, with the second picture size used as the shape information of the input tensor; and executing the new executable hardware commands to process the second sequence of pictures in the video.

18. The non-transitory computer-readable medium of claim 15, wherein the patching the one or more copies of the templated hardware command into the executable hardware commands includes:

modifying a field of the respective copy of the templated hardware command, the field including one of
a memory address corresponding to hardware commands of the first computation operation,
a memory offset corresponding to the respective copy of templated hardware command, and
a register value for filling a register of the processor.

19. The non-transitory computer-readable medium of claim 15, wherein the method further comprises:

receiving the deep learning model that is a dynamic shape model;

converting the dynamic shape model into a static shape model;

optimizing the static shape model to generate a low-level intermediate representation (IR) that is a hardware-optimized IP targeting the processor;

extracting the metadata from the low-level IR; and storing the metadata and model parameters of the deep learning model as the compiled result.

20. The non-transitory computer-readable medium of claim 19, wherein the optimizing the static shape model to generate the low-level IR includes:

tiling an output tensor of the first computation operation based on the hardware limitations of the processor executing the deep learning model; and generating the templated hardware command corresponding to each tile resulting from the tiling.

* * * * *